United States Patent [19]

Williams

[11] Patent Number: 4,755,813
[45] Date of Patent: Jul. 5, 1988

[54] SCREENING CIRCUIT FOR SCREENING IMAGE PIXELS

[75] Inventor: Leon C. Williams, Penfield, N.Y.

[73] Assignee: Xerox Corporation, Stamford, Conn.

[21] Appl. No.: 61,749

[22] Filed: Jun. 15, 1987

[51] Int. Cl.⁴ ............................................. G09G 1/02
[52] U.S. Cl. .................................... 340/799; 364/200; 364/900; 358/283; 382/50
[58] Field of Search ............... 340/721, 731, 746, 748, 340/750, 799; 358/282, 283; 364/200, 900; 365/231, 238, 233, 239

[56] References Cited

U.S. PATENT DOCUMENTS

| | | | |
|---|---|---|---|
| 3,900,834 | 8/1975 | Casey et al. | |
| 3,969,706 | 7/1976 | Proebsting et al. | 365/233 |
| 4,103,331 | 7/1978 | Thacker | 364/200 |
| 4,232,365 | 11/1980 | Englund | 364/200 |
| 4,404,554 | 9/1983 | Tweedy, Jr. et al. | 340/750 |
| 4,407,015 | 9/1983 | Ziobro | 364/200 |
| 4,419,662 | 12/1983 | Puskas et al. | 340/750 |
| 4,437,170 | 3/1984 | Moschitz et al. | 364/900 |
| 4,539,600 | 9/1985 | Takahashi et al. | 358/282 |
| 4,562,486 | 12/1985 | Suzuki et al. | 382/50 |
| 4,672,461 | 6/1987 | Yoshida | 358/282 |

FOREIGN PATENT DOCUMENTS 2159308 11/1985 United Kingdom ............... 365/238

*Primary Examiner*—Gerald L. Brigance
*Assistant Examiner*—Richard Hjerpe
*Attorney, Agent, or Firm*—Frederick E. McMullen

[57] ABSTRACT

A programmable screening circuit with memory for storing at each address location both a pixel screen value and the memory address of the screen value for the next pixel to be screened, and a control including a latch pair for separating data from each memory location addressed into a screen value for screening the pixel and an address for addressing the memory location for the next screen value.

6 Claims, 4 Drawing Sheets

SCREENING CIRCUIT FOR SCREENING IMAGE PIXELS

BACKGROUND OF THE INVENTION

1. Field of the Invention

The invention relates to electronic screening of image signals or pixels, and more particularly, to an improved screening circuit for screening image signals or pixels.

2. Description of the Prior Art

In current electronic printing systems when an original document such as a continuous tone photograph is scanned, digitized, and printed out by a high contrast printer, it is necessary to convert the continuous tone image into a bi-level or binary image by forming halftone cells whose size varies with the intensity of the original continuous tone image. This process is called halftoning or screening. However, the topology and characteristics of the halftone cells that comprise the screen that are used to convert the continuous tone image into a bi-level image affects the appearance of the final image. Further, selection of an appropriate screen for this purpose depends on the image original, the scanner, and the printer characteristics. Because of these variables, it is desirable to have a circuit that is flexible enough to generate screens of various topologies and characteristics.

Heretofore, to generate a screen pattern, a pair of counters, one for the row or line and the other for the column or pixel, were typically used to index into a pre-programmed screen table and thereby sequentially access various screen values. In this design, for each pixel in the scan line, the pixel counter is incremented by the system pixel clock pulses to sequentially access the next location in the screen table in synchronism with each pixel in the image line. Concurrently, at the end of each scan line, the line counter is incremented to access the screen table location for the next line. However, this design approach requires that the maximum X and Y dimensions of the halftone cell be determined and fixed at the time of the circuit design. If it is desired to re-program the circuit, additional and complex hardware is required to enable the counters to be reset to a different count. Further, this approach is limited to screen applications where the halftone cell is always rectangular.

In the prior art, U.S. Pat. No. 3,900,834 to Casey et al discloses a system designed to accommodate the situation where data on a common subject is stored at different locations within a memory, with no predetermined relation between the various memory locations. When it is desired to update the data, a controller sends the update messages to a common address table containing the address of the entry to be updated, and a chain address for another entry in the table where additional data on the same subject is stored. In U.S. Pat. No. 4,419,662 to Puskas et al, a character generator is disclosed in which display data stored in a memory is addressed to a video display by means of an output latch providing latched outputs to the video display.

SUMMARY OF THE INVENTION

In contrast to the prior art, the present invention provides a screening circuit for screening image pixels including non-rectangular halftone cells, comprising: a memory for storing plural screen data at predetermined address locations, the screen data at each of the address locations including a pixel screening factor for use in screening pixels and the address of the screen data for screening the next pixel; first means for receiving and temporarily holding the portion of the screen data at the memory location addressed that comprises the pixel screening factor pending use; second means for receiving and temporarily holding the portion of the screen data at the memory location addressed that comprises the address for the memory location of the screen data for screening the next pixel; and control means for writing the pixel screening factor of the screen data at the memory location addressed to the first means and the address portion of the screen data at the memory location addressed to the second means.

DESCRIPTION OF THE PREFERRED EMBODIMENTS

Figure 1:
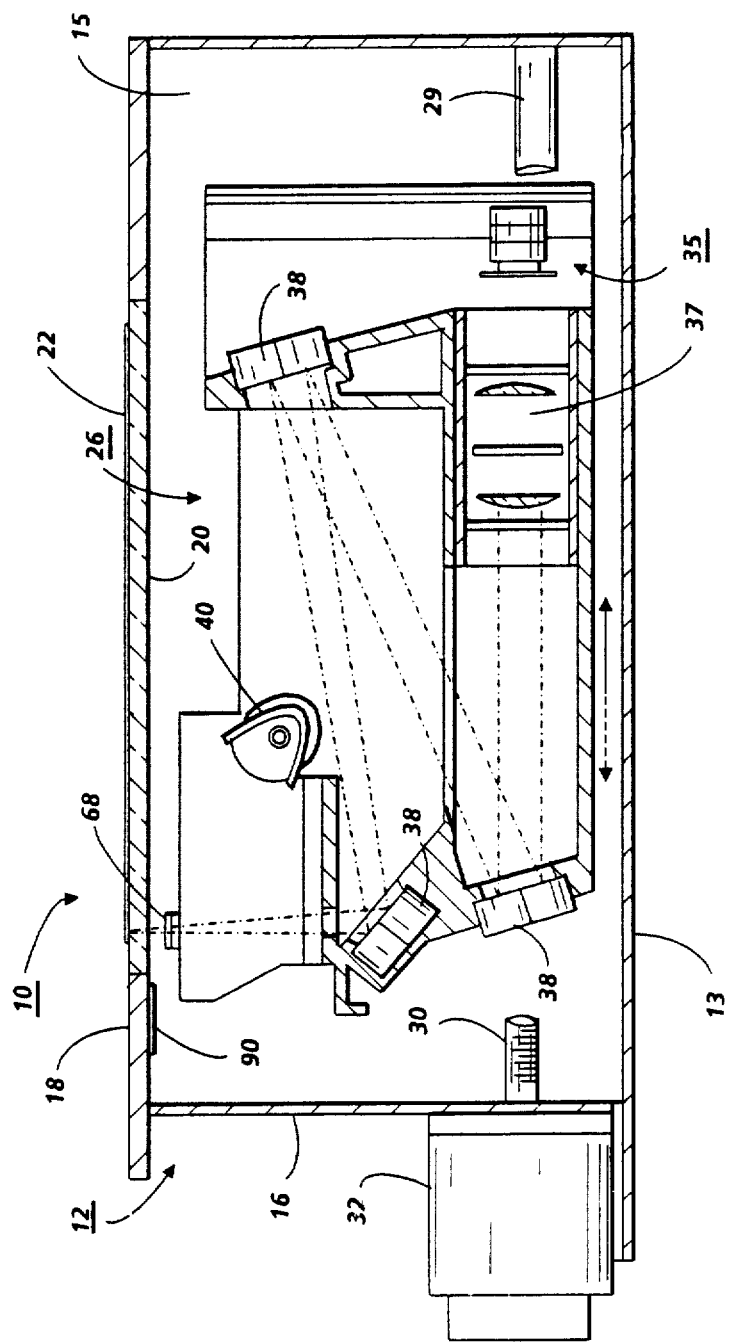
FIG. 1 is a schematic view of a raster input scanner of the type adapted for use with the screening circuit of the present invention.

Referring to FIG. 1, there is shown an exemplary raster input scanner, designated generally by the numeral 10, incorporating the screening circuit 8 (shown in FIG. 2) of the present invention. Scanner 10 includes a housing 12 with base 13, sides 15, and ends 16. The top 18 of housing 12 incorporates a generally rectangular transparent platen 20, typically glass, sized to accommodate the largest document original 22 to be scanned. As will be understood, a document 22 to be scanned is located either manually or by a suitable automatic document handler or feeder (not shown), on platen 20 for scanning. A scan carriage 26 is movably supported within housing 12 on base 13 for reciprocable movement underneath platen 20 on one or more longitudinally extending rails 29. Carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a forward or reverse direction as shown by the arrows in drawing FIG. 1.

A scanning array 35 such as a CCD is suitably mounted on scan carriage 26 in predetermined operative relation with platen 20 so as to scan the document resting thereon. Suitable optical means, exemplified here by lens 37 and mirrors 38, are provided to focus array 35 on a line-like area extending across the width of platen 20 and perpendicular to the direction of movement of carriage 26. Lamp 40 on carriage 26 illuminates the line-like area on which array 35 is focused. A suitable pixel clock 38 (shown in FIG. 2) provides the necessary clock signals for operating array 35.

While a single scanning array 35 is shown and described, plural arrays may instead be envisioned.

Figure 2:
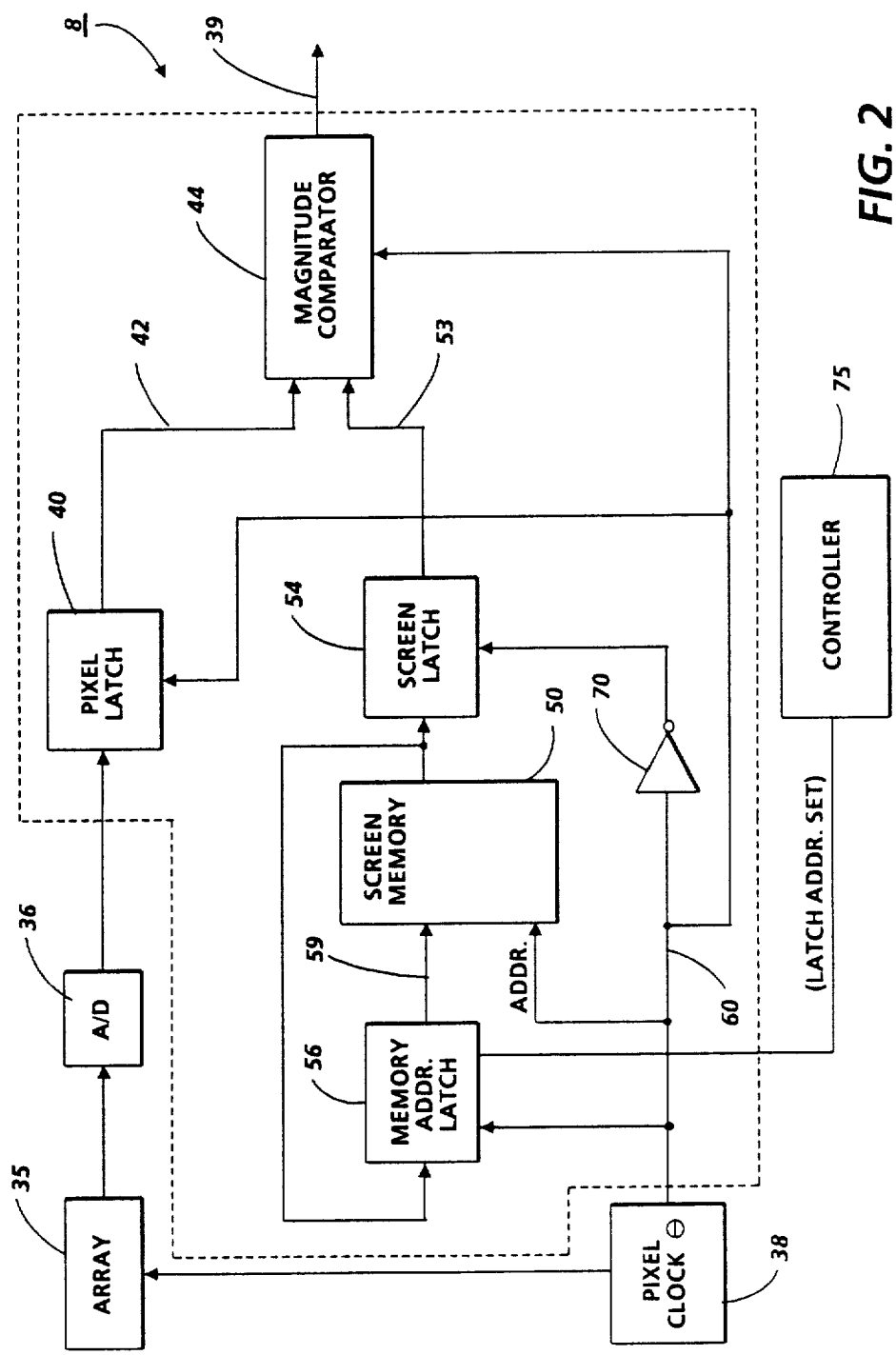
FIG. 2 is a schematic circuit diagram of the screening circuit of the present invention.
Figure 3:
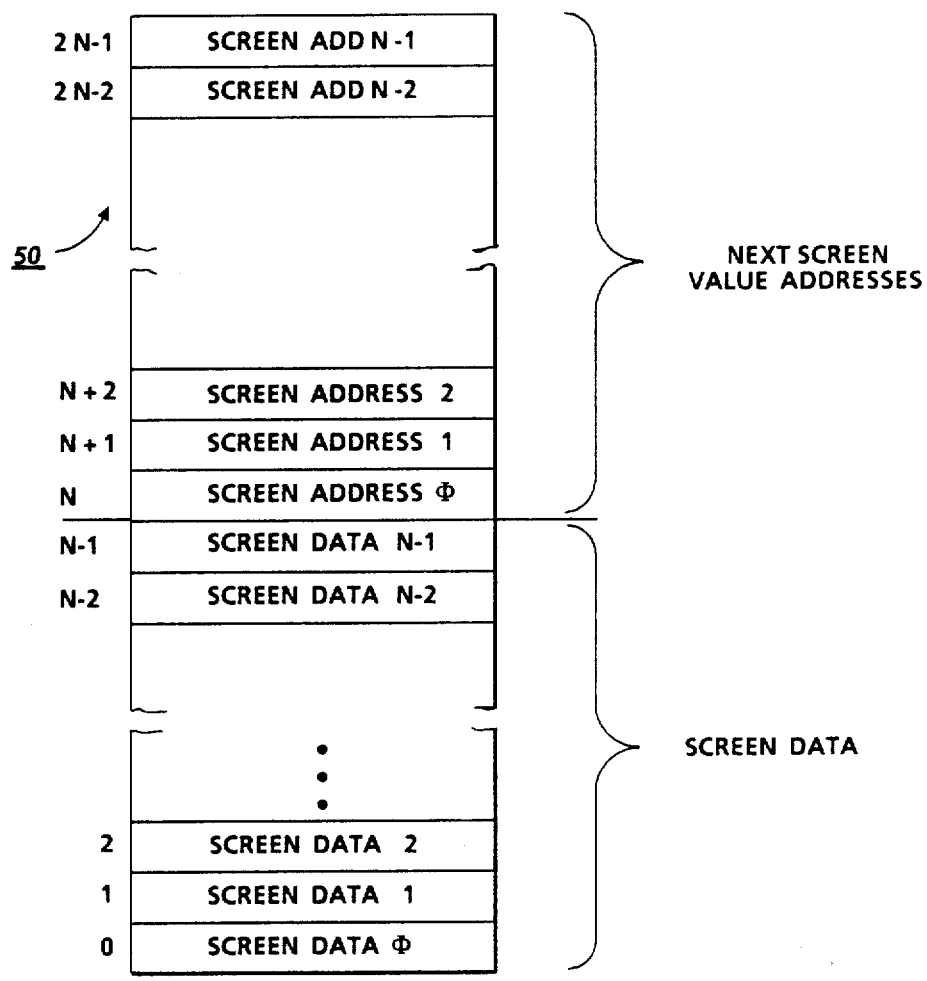
FIG. 3 is a view depicting an exemplary address jump table showing the relationship between the memory addresses of the screen value and address portions of the pixel screen data.
Figure 4:
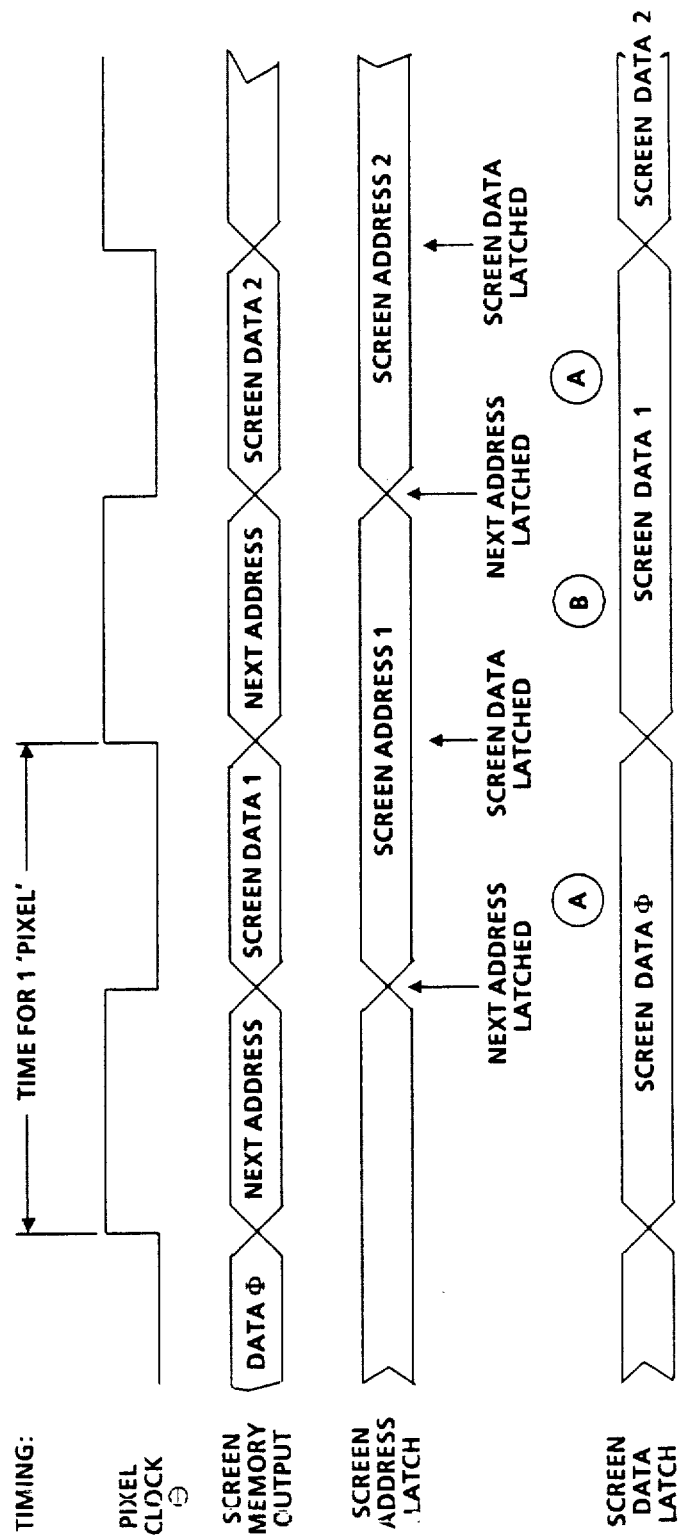
FIG. 4 is a timing chart showing operational timing control for the screen circuit shown in FIG. 2.

Referring to FIGS. 2-4, the image signals generated by scanning array 35 are suitably processed and converted to digital form by suitable signal processing circuitry including analog-to-digital (A/D) conversion means 36. For screening, the image pixels from A/D conversion means 36 are input to the screening circuit 8 of the present invention. Following screening, the screened image pixels are discharged to output line 39 for transfer, either directly or indirectly, to an end user (not shown). The end user may compise the next stage in the image processing circuitry leading to the output device associated with scanner 10, as for example a printer for printing copies of the image represented by the image pixels, a memory for storing the image pixels, communication line for transmitting the image pixels to a remote user, etc.

Screening circuit 8 includes a pixel latch 40 for temporarily holding each pixel in the image pixel stream while the pixel is being screened. The output of latch 40 is coupled by line 42 to one input of magnitude comparator 44. A screen memory 50, which may be either a RAM or ROM memory type, is provided for storing different pixel screen data at various locations in memory 50. The size of screen memory 50, as will be understood, is dependent on the screen type and size. Each pixel screen data stored in screen memory 50 is composed of a discrete screen value (SCREEN DATA) and a memory address (SCREEN ADDR), the latter being the address of the location in memory 50 of the pixel screen data containing the screen value for the next image pixel in the image pixel stream to be screened. Each discrete screen value and address in memory 50 bears a fixed relation N to one another as illustrated by the exemplary memory jump Table depicted in FIG. 3. There, for exemplary purposes, the address locations of the discrete screen values are designated by addresses 0, 1, 2, etc. with the locations of the addresses of the screen data for the next pixel to be screened designated by addresses N, N+1, N+2, etc.

The screen value portion (SCREEN DATA) of the pixel screen data addressed is output to screen latch 54 while the address portion (SCREEN ADDR) of the pixel screen data addressed is output to memory address latch 56. The output of screen latch 54 is coupled to a second input of comparator 44 by line 53 while the output of memory address latch 56 is coupled to the address input of screen memory 50 by line 59.

During screening, magnitude comparator 44 reads and compares the pixel value in pixel latch 40 and the screen value in screen latch 54 with one another. The screened pixel that results is output by magnitude comparator 44 to line 39. The address of the pixel screen data written into memory address latch 56 is used to address the location in screen memory 50 of the pixel screen data for the next image pixel.

Clock signals $\theta$ from pixel clock 38 are used to control and synchronize operation of screen circuit 8 with the pixel output of array 35. Pixel clock signals $\theta$ are supplied through clock lead 60 to pixel and memory address latches 40, 56 respectively, to the clock inputs of magnitude comparator 44 and screen memory 50 respectively, and, through inverter 70, to screen latch 54. A suitable micro-processor based controller 75 is provided, controller 75 providing a control signal to preset memory address latch 56 to the address in memory 50 for the pixel screen data having the screen value for the first pixel in the line being screened.

Referring particularly to FIGS. 2 through 4, at start up, memory address latch 56 is pre-programmed by controller 75 to the address location (i.e. N) of the address (i.e. SCREEN ADDR 0) of the screen value (i.e., SCREEN DATA 0) for the first pixel in the line. During the first half phase of the pixel clock pulse $\theta$, the address location (i.e. N+1) for the next pixel to be screened is accessed. At the phase transition of the pixel clock pulse from low to high, this address is latched in memory address latch 56. At the same time, a jump is made to the address location (i.e., 0) in memory 50 for the screen value (i.e., SCREEN DATA 0) currently addressed. On the second half phase of the pixel clock pulse, the screen value (SCREEN DATA 0) is accessed, and at the phase transition of the pixel clock signal from high to low (it is understood that inverter 70 renders the phase transition at latch 54 low to high), the screen value (i.e., SCREEN DATA 0) is latched in screen latch 54. The image pixel in pixel latch 40 and the screen value in screen latch 54 are compared by comparator 44, and the screened pixel output to line 39.

For the next pixel, during the first half phase of the next pixel clock pulse $\theta$, the address location (i.e., N+2) of the next address (SCREEN ADDR 2) of the screen data is accessed, latched in memory address latch 56 at the clock phase transition, and a jump made to the screen value that was addressed (i.e., SCREEN DATA 1). On the second half of the pixel clock pulse, the screen value (i.e. SCREEN DATA 1) is accessed and at the phase transition, latched in screen latch 54 for comparison by comparator 44 with the second pixel.

The aforedescribed process is repeated for each pixel in the line.

In screening circuit 8, a repetitive screen pattern is employed where following screening of every X number of pixels in the line, the pixel screen data reverts back to the screen data at the first address location (i.e, address N) in screen memory 50. For this, the address portion of the pixel screen data for the Xth pixel comprises the address location (i.e., N) for the screen value (i.e., SCREEN DATA 0) at the first memory location. In the exemplary jump Table shown in FIG. 3, the screen values (i.e., SCREEN DATA 0, SCREEN DATA 1, SCREEN DATA 2) at memory address locations 0, 1,2, respectively have address locations N+n, N+2, N associated therewith for the addresses (SCREEN ADDR 1, SCREEN ADDR 2, SCREEN ADDR 0) of the screen data for the next succeeding pixels. In this example, the screen values are repeatedly addressed across the scan line every three pixels.

Additionally, a different set of screen values is employed for each line up to a maximum of Y lines following which screening circuit 8 reverts to the screen values for the first line. In the Table shown in FIG. 3, for the next line controller 75 increments address latch 56 such that the starting address pre-programmed into latch 56 for the screen data for the first pixel in the second line is address location N+3. As a result, the screen values (i.e., SCREEN DATA 3, SCREEN DATA 4, SCREEN DATA 5) at memory addresses 3, 4, 5 and having address locations N+4, N+5, N+3 associated therewith, are repeatedly selected across the next line. The foregoing process is repeated, with a jump made in screen data for each succeeding line until Y number of lines have been processed. At that point, controller 75 pre-programs address latch back to the first address location (i.e., N) in screen memory 50.

It is understood that the aforedescribed addressing sequence may be reversed and the screen value addressed first followed by addressing of the memory location for the next screen value. Further, that other and various combinations of repetitive screen values for each line and for multiple lines may be contemplated.

While the invention has been described with reference to the structure disclosed, it is not confined to the details set forth, but is intended to cover such modifications or changes as may come within the scope of the following claims.

What is claimed is:

1. Means for screening each pixel in a succession of image pixels comprising:
   (a) a memory for storing plural screen data at predetermined address locations, each of said data including a preset pixel screening factor for use in screening a pixel in said succession of pixels and the address of the memory location of the screen data for screening the next pixel following said pixel in said succession of pixels;
   (b) first means for receiving and temporarily holding the portion of the screen data at the memory location addressed that comprises said preset pixel screening factor for screening said pixel;
   (c) second means for receiving and temporarily holding the portion of the screen data at the memory location addressed that comprises said address for the memory location of the screen data for screening said next pixel; and
   (d) control means for writing said preset pixel screening factor from said screen data at the memory location addressed to said first means and said address from said screen data at the memory location addressed to said second means in predetermined timed sequence with said succession of image pixels whereby said preset pixel screening factor is received in said first means for screening said pixel and said address for the screen factor for said next pixel is received in said second means for addressing the memory location of the screen data for screening said next pixel in timed sequence with said pixels.

2. The screening means according to claim 1 in which said control means includes means to read said screen data from said second means to said memory whereby the memory location for the pixel screen data for the next pixel is addressed.

3. In an image screening system for processing a stream of image pixels, the combination of:
   (a) a memory for storing pixel screening data at discrete address locations,
   each of said pixel screening data including a pixel screen value and a memory address for use in addressing the memory location containing the pixel screen data for the next pixel in said stream of pixels;
   (b) a first latch for receiving and temporarily storing the pixel screen value portion of the pixel screening data at the memory location addressed pending processing of the pixel associated with said pixel screening data;
   (c) a second latch for receiving and temporarily storing the memory address portion of the pixel screening data at the memory location addressed pending use of said memory address to address the location in said memory of the pixel screening data for the next pixel in said stream of pixels; and
   (d) control means for actuating said first and second latches in a predetermined timed sequence associated with each pixel in said stream of pixels whereby, for each memory location addressed, the screen value associated with that data location is input to said first latch for use in processing the pixel associated with said pixel screening data and the address of the memory location for the pixel screening data of the next pixel in said stream of pixels is input to said second latch.

4. In an image screening system for processing image pixels, the combination of:
   (a) a memory for storing plural screen data at predetermined address locations, each of said data including a preset pixel screening factor for use in screening pixels and the address of the memory location of the screen data for screening the next pixel;
   (b) first means for receiving the screening factor of the screen data addressed for use in screening one of said pixels;
   (c) second means for receiving the address of the screen data addressed for use in addressing the location in said memory of the screen data for the next pixel to be screened;
   (d) control means for separating the screen data addressed into said screening factor and said address and directing said screening factor to said first means and said address to said second means;
   (e) third means for receiving the pixel to be screened by the screen data addressed; and
   (f) comparator means for comparing the screening factor in said first means with the pixel in said third means and providing an output representing the pixel to be screened;
   said control means synchronizing reading of said screening factor in said first means and reading of said pixel in said third means by said comparator means to provide the pixel to be screened.

5. The system according to claim 4 in which
   a predetermined one of said screen data address locations comprises the location of the screen data previously used for screening whereby said screen data is periodically repeated along the scan line.

6. The system according to claim 5 including
   second control means for presetting said second means to a different address of preset screen data for each image pixel line processed.

* * * * *